United States Patent Office 3,196,705
Patented July 27, 1965

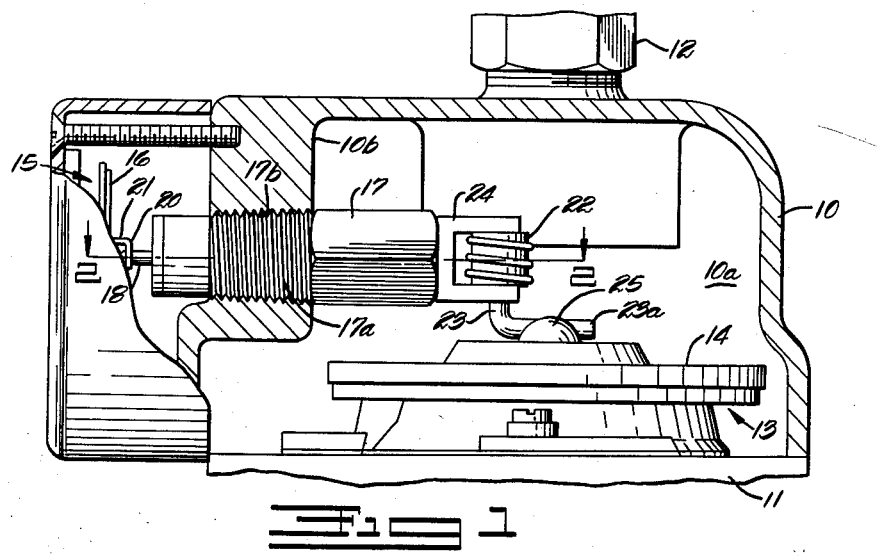
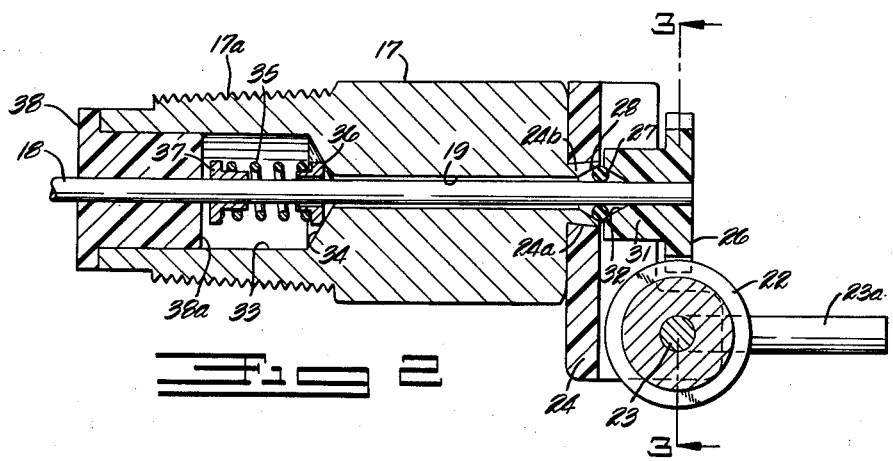
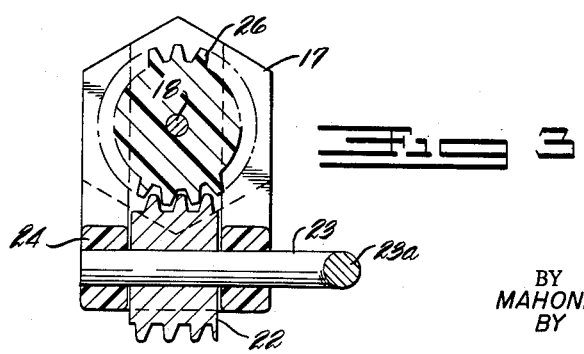

3,196,705
UNITARY INDEX DRIVE SHAFT ASSEMBLY
FOR GAS METERS
Charles W. Stewart, Lancaster, Ohio, assignor to
Karl L. Schaus, Tempe, Ariz.
Filed Nov. 14, 1963, Ser. No. 323,690
3 Claims. (Cl. 74—425)

This invention relates generally to gas meters and, more specifically, to an improved fluid-impervious index drive shaft assembly for a gas meter.

Industrial or residential types of volumetric flow meters for fuel gas consist in general of a measuring mechanism enclosed within a diaphragm housing through which the gas is directed. Mechanically coupled to the measuring mechanism and driven thereby is a valve mechanism and a volumetric indicating mechanism. In the usual meter construction, the valve mechanism, which includes a movable valve plate, is contained within a valve casing attached to the exterior of the diaphragm housing. The valve casing also serves as a distribution chamber for the gas flowing into the meter. The indicating mechanism is connected to the movable valve member by a drive shaft assembly extending through a wall of the valve casing. Since the gas is maintained at a pressure above atmospheric, it is essential that a gas-impervious seal be maintained between the drive shaft assembly and the valve casing. It has long been the practice in gas meter manufacturing to utilize the well-known stuffing box to obtain the required sealing effect.

The usual stuffing box consists in general of a plug or housing which extends through the wall of the valve casing and which is formed with an axially extending bore through which the index drive shaft extends. A quantity of packing material fabricated from a yieldable fibrous material impregnated with a lubricant is disposed in the bore of the stuffing box and forms a gas-impervious seal around the drive shaft. To maintain the packing material in sealing engagement with the shaft and the walls of the stuffing box, a packing gland is threaded into the external end of the bore and compresses the packing material. Often, a plurality of spring-pressed washers fabricated from a compressible material are substituted for the packing material. Screwing the packing gland into the bore of the stuffing box compresses the washers to form a fluid-impervious seal between the shaft and the interior walls of the stuffing box. Compressing the packing material or washers sufficiently to form a fluid-impervious seal simultaneously produces a frictional, binding effect on the shaft. Thus, an inherent problem with a stuffing box-type seal resides in determining and applying a more or less critical compressive force sufficient to create an optimum sealing effect with minimal frictional resistance on the shaft. The usual tendency in assembling a stuffing box in a gas meter is to apply excessive compression to the packing member or members, thus increasing the friction on the rotatable shaft. The excess frictional force decreases the mechanical efficiency of the meter mechanism, and increases the wear on the packing material or washers. Although the stuffing box may also be packed with a paste-type lubricant to reduce wear and friction and form a more effective seal, operating personnel must periodically inspect this type of seal to assure continued satisfactory performance. Periodic inspection, servicing, and replacement of stuffing boxes and their components accounts for a large portion of the maintenance costs of gas meters.

It is, therefore, the primary object of this invention to provide a more efficient, factory-assembled index drive shaft assembly for a gas meter which will last for the full life of the meter without requiring periodic inspection, servicing, repair or replacement.

It is a further object of this invention to provide an index drive shaft assembly for a gas meter which includes a resilient sealing ring mounted on the index drive shaft and maintained in sealing engagement with the drive shaft and a relatively stationary, surrounding housing by pre-tensioned spring means.

These and other objects and advantages of this invention will be readily apparent from the following detailed description and the accompanying drawing, in which:

FIG. 1 is a fragmentary vertical sectional view taken through the valve casing of a gas meter embodying an index drive shaft assembly constructed in accordance with this invention;

FIG. 2 is an enlarged horizontal sectional view of the present index drive shaft assembly taken along line 2—2 of FIG. 1; and FIG. 3 is a vertical sectional view taken along line 3—3 of FIG. 2.

Having reference to FIG. 1 of the drawing, the index drive shaft assembly of this invention is illustrated mounted in assembled relationship with connecting members of a gas meter. The general constructional characteristics of a meter of this type are well-known and, therefore, only the portions including components mechanically coupled to the index drive shaft assembly are illustrated. A valve casing 10 secured to a diaphragm casing or enclosure 11 forms a distribution or valve chamber 10a for gas flowing through the meter. Connected to the valve casing 10 is a conduit 12 which opens to the distribution chamber and through which gas under pressure flows into the meter. Controlling the flow of gas from the distribution or valve chamber into the diaphragm casing 11 is a rotary-type valve mechanism 13. The valve mechanism 13 is disposed within the distribution chamber and includes an orbiting valve plate 14 which is mechanically coupled to the measuring mechanism of the meter, not shown, to revolve in a horizontal plane at a speed proportional to the volume of gas flowing through the meter. A visual indicating mechanism, generally indicated at 15, and commonly referred to as an index, is externally mounted on the valve casing 10 to provide a cumulative record of the volume of gas which has passed through the meter. The index 15, in the usual manner, includes a plurality of dials and associated gear train 16 mechanically interconnected to provide a cumulative volume indication. The index drive shaft assembly is mounted in an opening formed in a wall 10b of the valve casing 10 for transmitting the revolving motion of the valve plate 14 to the index drive gears 16 and causes rotation thereof at a speed proportional to volumetric rate of flow of gas through the meter.

The index drive shaft assembly of the present invention includes an elongated housing 17 and a coaxial drive shaft 18. A portion of the housing 17 is externally threaded, as at 17a, for threaded engagement with an internally threaded, tapered socket 17b formed in the wall 10b of the casing 10. One end of the housing 17 extends into the valve chamber 10a of the casing 10 and is hexagonally shaped to facilitate engagement thereof by a wrench for installation purposes. The drive shaft 18 extends axially through a bore 19 formed in the housing 17. The ends of the shaft 18 extend outwardly beyond each end of the housing 17. The left hand end of the shaft 18, as viewed in FIG. 1, is provided with a crank arm 20 having an off-set crank pin 21 drivingly connected with the gear train 16.

A right angle drive is provided between the opposite or right hand end of the drive shaft 18 and the valve plate 14. The right angle drive includes a worm 22 fixed to the vertically disposed arm 23 of a right angle crank 23a. The vertical arm 23 is journalled in the flanges of a U-shaped bracket 24 which is fixed to the inner end of the housing 17 in alignment with the axis of revolution of the valve plate 14. The bracket 24 is preferably fabricated from a suitable self-lubricating thermosetting resin having a low coefficient of friction to reduce the frictional resistance to rotation of the arm 23. An opening 24a is formed in the web of the bracket to frictionally receive a reduced diameter boss 24b formed on the end of the housing 17. The crank 23a is engaged by a crank stud 25 carried on the valve plate 14. Fixed on the inner end of the drive shaft 18 is a worm gear 26 which meshes with the worm 22. The revolving motion of the valve plate 14 will thereby be transmitted to the drive shaft 18 and, in turn, to the index gear train 16.

In accordance with the illustrated embodiment of this invention, a resiliently compressible, annular sealing ring 27 is mounted on the drive shaft 18 between the boss 24b of the housing 17 and the hub of the worm gear 26. The ring 27 is circular in form having an internal diameter slightly less than the diameter of the drive shaft 18 and is preferably fabricated from a resiliently compressible synthetic rubber or elastomer. Thus, the ring 27 resiliently conforms to the shaft 18, forming a fluid-impervious seal therearound. To form a fluid-impervious seal between the ring 27 and the housing 17, the end boss 24b of the housing 17 is formed with a conical seat 28 to partially receive the sealing ring 27. The physical dimensions of the ring 27 are such that the ring will be at least partially disposed within the conical seat 28 and in contacting engagement therewith, forming a fluid-impervious seal between the shaft 18 and the housing 17. The seat 28 also forms a bearing surface for rotatably supporting the ring 27 and the inner end portion of the shaft 18.

To maintain the ring 27 in seated engagement with the conical seat 28, the gear 26 is provided with an axial hub 31 formed at the end thereof with a conical seat 32 shaped similarly to the seat 28 for engaging the opposite side of the ring 27.

Gas pressure normally present within the valve casing 10 acts against the larger exposed face of the gear 26 and tends to force the gear 26 and shaft 18 axially toward the index end of the housing. This causes the sealing ring 27 to be compressed between the conical seats 28 and 32 and around the shaft 18, to thus provide an effective seal against the passage of gas through the bore 19 of the housing 17.

Although the gas pressure within the valve casing 10 is normally sufficient to assure a continuous sealing engagement between the ring 27 and the cooperative conical seats 28 and 32, it is also desirable to provide a spring means for biasing the shaft 18 in the direction of the indicating mechanism 16. Toward this end, the outer end of the housing is formed with a relatively enlarged counterbore or cavity 33 communicating with the bore 19 and surrounding the intermediate portion of the shaft 18. The inner end of the cavity 33 is tapered inwardly toward the bore 19 forming a conical seat 34. Encircling the shaft 18 within the cavity 33 is a helically wound coil spring 35. To provide a bearing for one end of the spring, a first grommet 36 is slidably mounted on the shaft 18 between the spring and the conical seat 34 of the cavity. A second grommet 37 is press-fitted on the shaft 18 at the opposite end of the spring. The second grommet 37 is fixed to the shaft 18 by any suitable means, such as press-fitting, so as to maintain the spring 35 under slight compression and thus bias the shaft 18 in the direction of the indicator mechanism 15. This, additionally, insures sealing contact between the worm gear 26 and the sealing ring 27 regardless of thermal expansion or contraction of the shaft 18.

After assembly of the spring 35 and shaft 18, a bearing plug 38 is inserted in the end of the cavity 33. The plug 38 is preferably fabricated from a suitable self-lubricating thermosetting resin and has an external diameter slightly larger than the diameter of the cavity 33 to produce a force fit that secures the plug permanently in position. The length of the plug 38 is such that, when assembled with the housing 17, the internally disposed end 38a will be spaced a slight distance from the second grommet 37 to permit limited axial movement of the shaft 18 in response to thermal expansion and contraction thereof.

In operation, the index drive shaft assembly provides a fluid-impervious rotatable shaft seal that does not require periodic inspection and adjustment to maintain an effective seal. The gas pressure acting on the inner end of the shaft 18 and gear 26 aids the spring 35 in maintaining the sealing ring 27 in engagement with the conical seat 28 formed in the end of the housing 17. The inclined surface of the seat 28 in cooperation with the inclined surface of the conical seat 32 of the gear 26 also compresses the ring 27 tightly about the shaft 18 to form a fluid-impervious ring-to-shaft seal.

While the specific embodiment of the invention shown in FIG. 2 of the drawing illustrates the sealing ring 27 as being positioned between the hub 31 of the worm gear 26 and the conical seat 28 formed on the inner end of the housing 17, it will be understood that the position of the sealing ring 27 may be varied without departing from the general principles of this invention. For example, if desired, the sealing ring 27 may be positioned on the shaft 18 between the inner face 38a of the bearing plug 38 and the second grommet 37, and in this modified position, will provide an effective gas-tight seal between the shaft 18 and the interior of the housing.

It is readily apparent that the index drive shaft assembly of this invention provides an optimum shaft sealing effect with a minimal frictional force. The assembly may be economically manufactured and installed at the factory and will normally last for the full life of the meter without requiring servicing or field adjustment.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A unitary index drive shaft assembly for a gas meter of the type having an internal valve chamber and a volumetric flow-indicating mechanism disposed exteriorly of said valve chamber and separated therefrom by a casing wall, said assembly comprising an elongated, tubular housing formed with an intermediate, externally screw-threaded surface for threaded engagement with the casing wall of the meter, said housing being formed with a shaft-receiving bore extending axially therethrough; an index drive shaft extending axially through the bore of said housing and having an outer end portion arranged for driving connection with the flow-indicating mechanism of a meter and an inner end portion arranged to extend into the valve chamber of such meter; gear means drivingly secured to the inner end of said shaft for imparting rotation thereto; an annular, resiliently compressible sealing ring carried snugly on said shaft and engaging said housing adjacent the shaft-receiving bore thereof; and spring means rotatably engaging said shaft and urging said sealing ring into sealing engagement with said housing.

2. A unitary index drive shaft assembly for a gas meter comprising an elongated tubular housing means having an externally screw threaded surface for mounting said assembly in a wall of a gas meter, said housing means including a shaft-receiving bore extending axially therethrough; an index drive shaft extending axially and rotatably through the bore of said housing means; gear means drivingly connected with one end of said shaft for imparting axial rotation thereto; an annular, resiliently compressible sealing ring carried snugly on said shaft and engaging said housing means adjacent the shaft-receiving bore thereof; and spring means mounted in said housing means and operable to maintain said sealing ring in tight-fitting engagement with said housing means.

3. In a gas meter having a valve casing defining an internal gas distribution chamber into which a pressurized gas is introduced, and a volumetric indicator mechanism disposed exteriorly of said valve casing; a unitary index drive assembly comprising an elongated tubular housing extending through a wall of said valve casing and formed with an axially extending shaft-receiving bore communicating at one end thereof with the chamber of said valve casing; an elongated rotatable shaft extending through the bore of said housing and having an outer end portion extending outwardly beyond said housing and drivingly connected with the indicator mechanism of said meter and an inner end portion extending into the chamber of said valve casing; a worm gear fixed to the inner end portion of said shaft within the chamber of said valve casing; a worm drive carried by said housing in meshing engagement with said gear; an annular, resiliently compressible sealing ring carried on the inner end portion of said shaft between said gear and said housing; and spring means rotatably engaged with said shaft for maintaining said sealing ring under compression between said gear and said housing.

References Cited by the Examiner
UNITED STATES PATENTS
3,064,938  11/62  Knox _____ 251—249.5

DON A. WAITE, *Primary Examiner.*